United States Patent [19]

Umebayashi et al.

[11] Patent Number: 4,796,129
[45] Date of Patent: Jan. 3, 1989

[54] MAGNETIC HEAD DEVICE FOR IMPROVING HEAD PLACEMENT ON A MAGNETIC DISC

[75] Inventors: Nobuhiro Umebayashi; Yoshito Tanaka, both of Ibaragi, Japan

[73] Assignee: Hitachi Maxell, Ltd., Osaka, Japan

[21] Appl. No.: 1,195

[22] Filed: Jan. 7, 1987

[30] Foreign Application Priority Data

Jan. 10, 1986 [JP] Japan ................................. 61-2195

[51] Int. Cl.⁴ .......................... G11B 5/48; G11B 21/16
[52] U.S. Cl. ................................. 360/104; 360/130.34
[58] Field of Search ................. 360/104, 105, 97–99, 360/130.34

[56] References Cited
U.S. PATENT DOCUMENTS 4,306,260 12/1981 Maeda et al. .................... 360/104

FOREIGN PATENT DOCUMENTS 3524424  1/1986  Fed. Rep. of Germany ...... 360/104
58-153271  9/1983  Japan ................................. 360/104
60-136979  7/1985  Japan ................................. 360/104
60-167159  8/1985  Japan ................................. 360/104

Primary Examiner—John H. Wolff
Assistant Examiner—Matthew J. Bussan
Attorney, Agent, or Firm—Birch, Stewart, Kolasch & Birch

[57] ABSTRACT

A magnetic head device with head cores connected to end surfaces of sliders, opposing each other on both sides of a magnetic disc, wherein one head core and slider combination is mounted on a gimbal spring, and a pivot member for pressing the magnetic disc, the pivot having plural pressing members aligned in the radial direction of the magnetic disc, the pivot being formed so that the pressing force can be applied generally uniformly to every part of the upper core and lower core.

3 Claims, 6 Drawing Sheets

MAGNETIC HEAD DEVICE FOR IMPROVING HEAD PLACEMENT ON A MAGNETIC DISC

BACKGROUND OF THE INVENTION

1. Field of the Invention

The present invention relates to a magnetic head device for use in a disc drive for a magnetic disc, and in particular to the structure in a head carriage of the magnetic head device.

2. Description of the Prior Art

In a disc drive device for writing and reading information in a magnetic disc, a so called floppy disc, there has been used a head carriage for mounting a magnetic head for moving along in the radial direction of the floppy disc and a drive device which writes in and reads out the information at a predetermined position of the rotating magnetic disc by the rotation of the disc.

FIGS. 1 and 2 are views showing the structure of a conventional head device. A pair of cores 3a and 3b is respectively supported by an upper slider 5a and a lower slider 5b in a carriage 1. The magnetic disc 10 is represented as shown. In the arrangement, the width of the core is from 0.8 to 1.2 mm wide and each of the cores 3a and 3b is pressed onto the opposing side slider so that the head is in contact with the slider. However, since the sliding width of the core is wide and the area of the connected portion of the magnetic disc is wide, such as the amount of 3.5×6 mm, there tends to occur spacing which is disadvantageous for high density recording.

In order to solve the above mentioned problem, as shown in FIGS. 3 and 4, an arrangement of supporting the cores 3a and 3b respectively in the sliders 5a and 5b was eliminated and another arrangement in which the cores 3a and 3b were bonded to the respective end surfaces of the sliders 5a and 5b were suggested. In this arrangement the bonded areas of both of the cores 3a and 3b and each of the sliders 5a and 5b can be small so as to eliminate the spacing problem, but since the condition between the height of the core and the height of the slider becomes unbalanced, a rotational moment of the head in the radial direction of the disc is generated so as to vibrate the head. Therefore, as shown in FIG. 2, a means for making the vibration of the head small is adapted in the manner that the top portion of the upper slider 5a is pressed by a pivot 2 of a pressing means at generally the middle position between the upper core 3a and lower core 3b. However, although the vibration can be made small, there is a problem that the output of at least one side of the upper and lower sides of the magnetic disc is lowered. That is, it can be seen that with the changing of the pressing point on the magnetic disc by the pivot 2, the output of the lower side is lowered when the pressing point is closer to the upper core 3a and the output of the upper side is lowered when the pressing point is closer to the lower core 3b.

SUMMARY OF THE INVENTION

The present invention is made in consideration of the problem described above and the pivot is arranged so that the pressing force can be applied generally uniformly to the upper and lower cores 3a and 3b.

Applicants have conducted an experiment of the relationship between the pressing position and the head displacement, and the reproduction output. Before the embodiment of the present invention is explained, the results of this experiment are explained as follows.

FIGS. 5(a) and 5(b) are graphs showing the relationship between the pressing position of the pivot and the head displacement, and the reproduction output when the upper slider 5a of the magnetic head device shown in FIG. 3 is pressed at different positions on the upper slider 5a. In the case of pressing the point A, shown in FIG. 3, referring to the reproduction output, the output of the upper side becomes high and the output of the lower side becomes low. Also, the rotation angle $\theta r$ of the head with respect to the radial direction of the magnetic disc becomes large. In case of the pressing point B, since the point B is situated at generally the middle position between both cores 3a and 3b, the reproduction outputs of both the upper and lower sides become slightly low but the vibration of the head is small. Moreover, in the case of pressing point C, the output of the lower side becomes maximum but the output of the upper side is greatly lowered and both the rotation angle $\theta r$ of the head to the radial direction of the magnetic disc and the rotation angle $\theta p$ (see FIG. 3(b)) of the head to the movement direction of the recording medium become large. According to this experiment, it was found that when the pressing points were respectively situated close to each core, both high outputs of the upper and lower sides of the magnetic disc could be obtained, suppressing the head displacement.

The present invention is made on the basis of the observation determined from the experiment described above.

DETAILED DESCRIPTION OF THE INVENTION

The embodiment of the present invention is explained with reference to the attached drawings hereinafter discussed.

Figure 9:
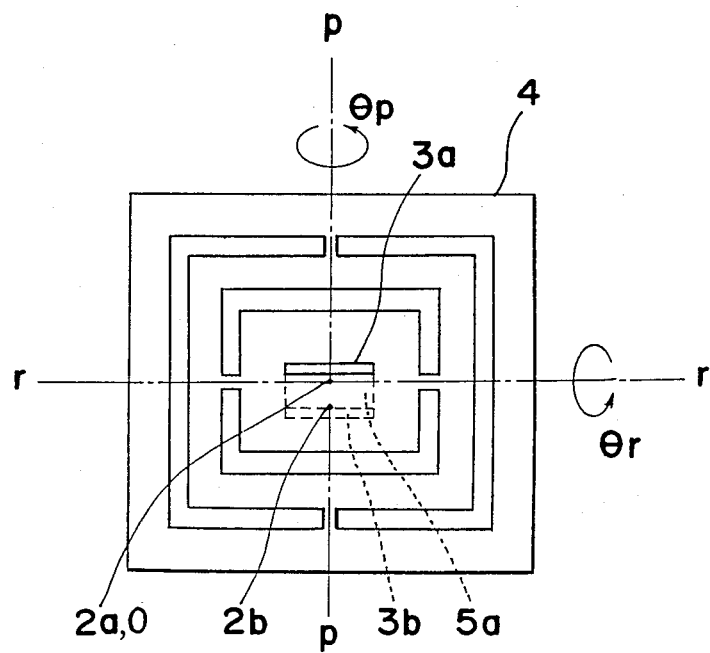
FIG. 9 is a plan view showing a gimbal spring used in an embodiment according to the present invention.
Figure 10:
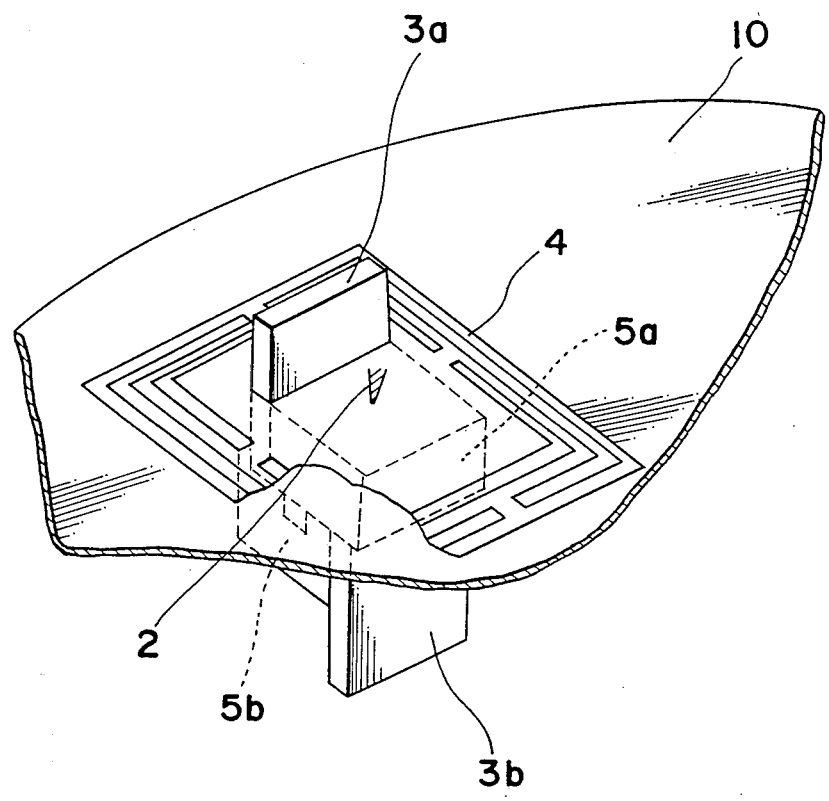
FIG. 10 is an enlarged perspective view of the essential part of the magnetic head device shown in FIG. 6.

Referring now to FIGS. 6 through 10, a magnetic head device according to the present invention comprises a bottom substructure 1b of a L character shape made of plastic resin material and a top substructure 1a made of plastic resin material connected so that it rotates vertically to the bottom substructure 1b through a plate spring 7. A pressing spring 8 presses the top substructure 1a toward the bottom substructure 1b. A slider 5b (lower slider) made of barium titanate is assembled on the end portion of the bottom substructure 1b, being bonded to one side end surface of the magnetic head core 3b of about 0.6 mm width (the contacted area of the recording medium of 3.6 mm×2.7 mm). On the other hand, on a corresponding end portion of the top substructure 1a, a slider 5a (upper slider) made of barium titanate is assembled to the central portion of a gimbal spring 4 under the condition of being bonded to one side end surface of the magnetic head core 3a of about 0.6 mm width (the contacted area of the recording medium of 3.6 mm×2.7 mm), and the gimbal spring 4 is attached to and in the lower end portion of the top substructure 1a. As shown in FIG. 9, the gimbal spring 4 is formed by phosphor bronze plate or stainless steel plate etc. of 0.05 to 0.10 mm thick having an axis r—r passing through the center O and is parallel with the tangent line of the circle of the disc 10, having an axis p—p passing through the radius which is at right angle to the axis r—r and resiliently supports the magnetic head core 3a and the slider 5a.

Figure 1:
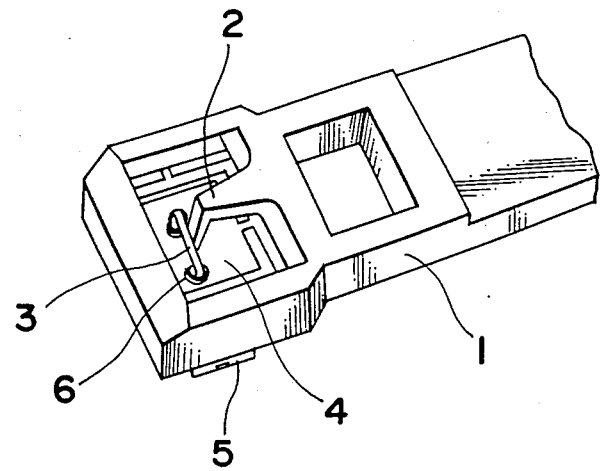
FIG. 1 is a perspective view of a conventional head device.
Figure 2:
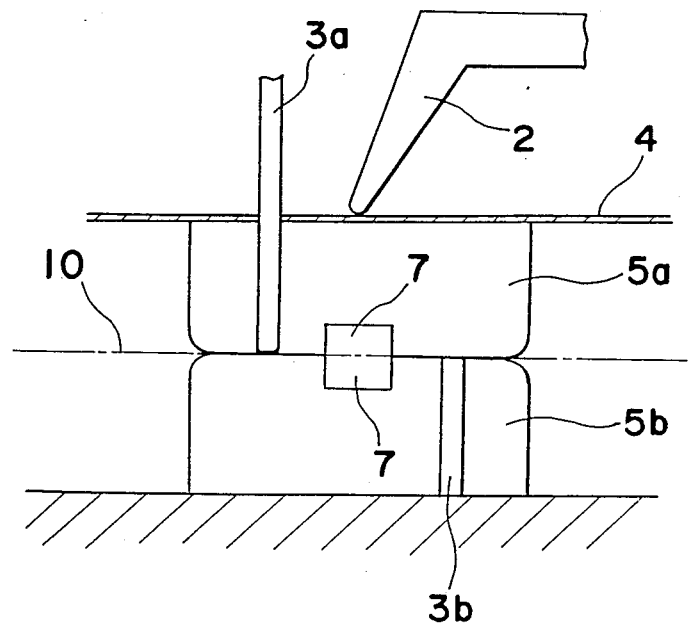
FIG. 2 is an enlarged longitudinal sectional view of the head device shown in FIG. 1.
Figure 3:
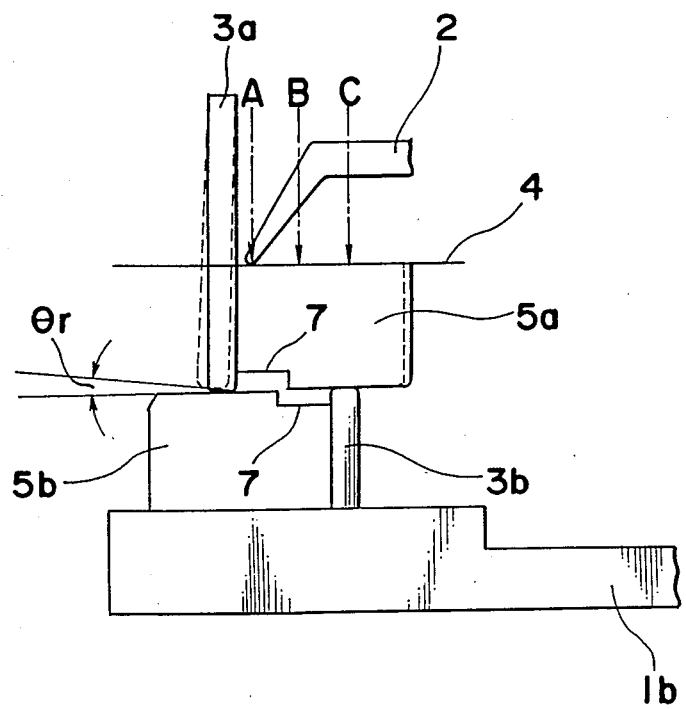
FIG. 3 is a side view of the conventional head device of the improved type.
Figure 4:
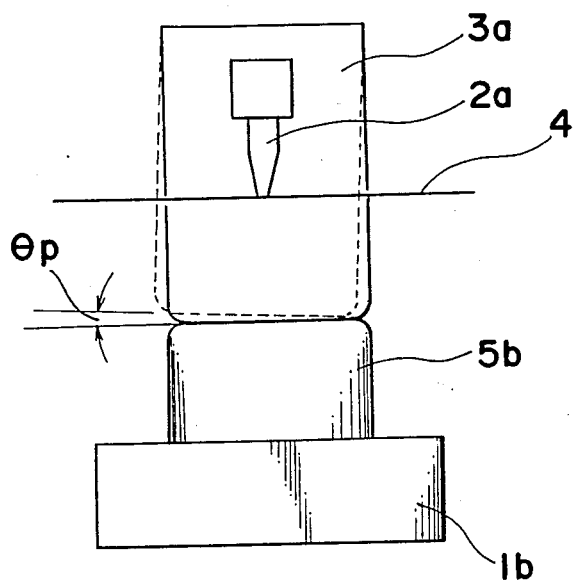
FIG. 4 is a front view of the conventional head device of the improved type.
Figure 5A:
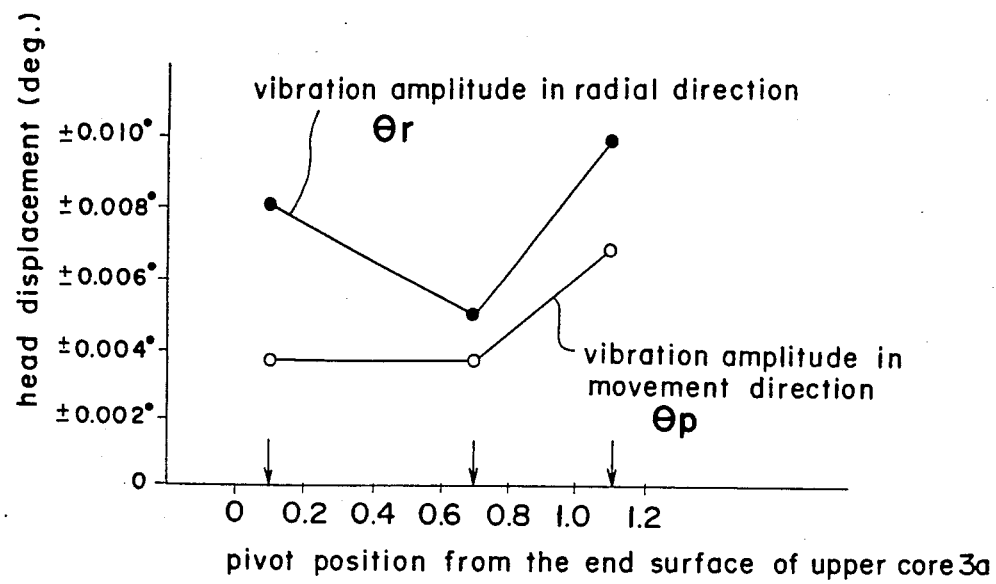
FIGS. 5(a) and 5(b) are graphs showing the relationship between the displacement of the head and the reproduction output and the distance of the pivot from the end surface of the upper core 3a, FIG. 6 is a perspective view showing a magnetic head device of an embodiment according to the present invention.
Figure 5B:
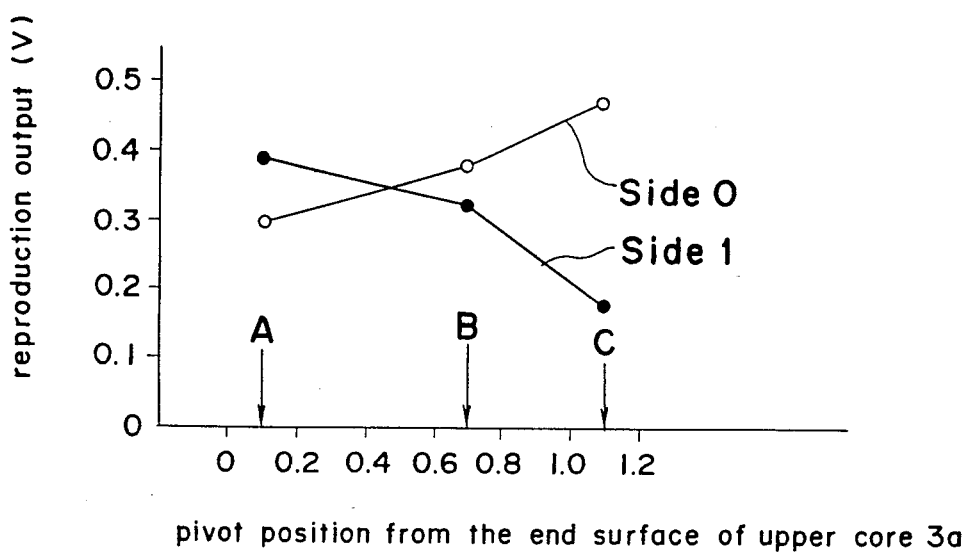
Figure 6:
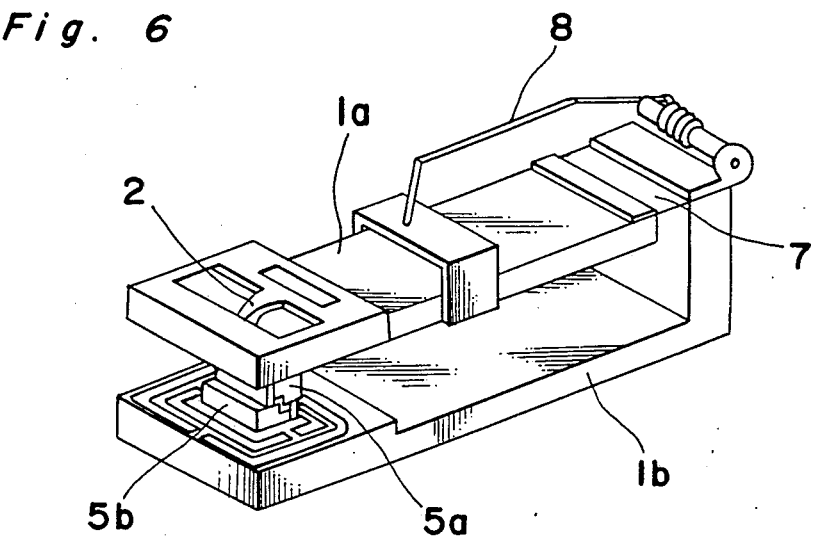
Figure 7:
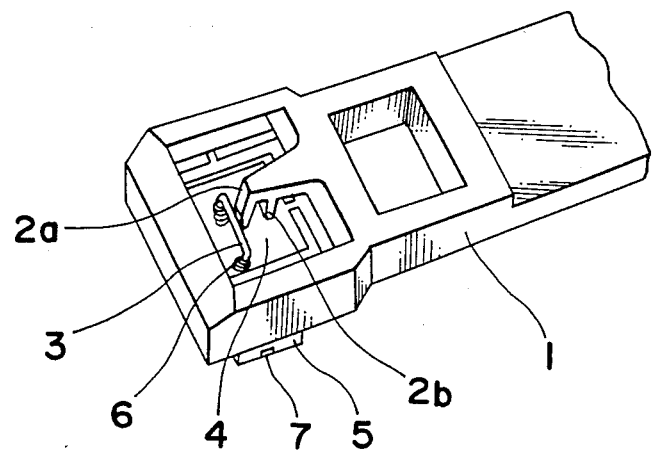
FIG. 7 is an enlarged view of an essential part of the magnetic head device shown in FIG. 6.
Figure 8:
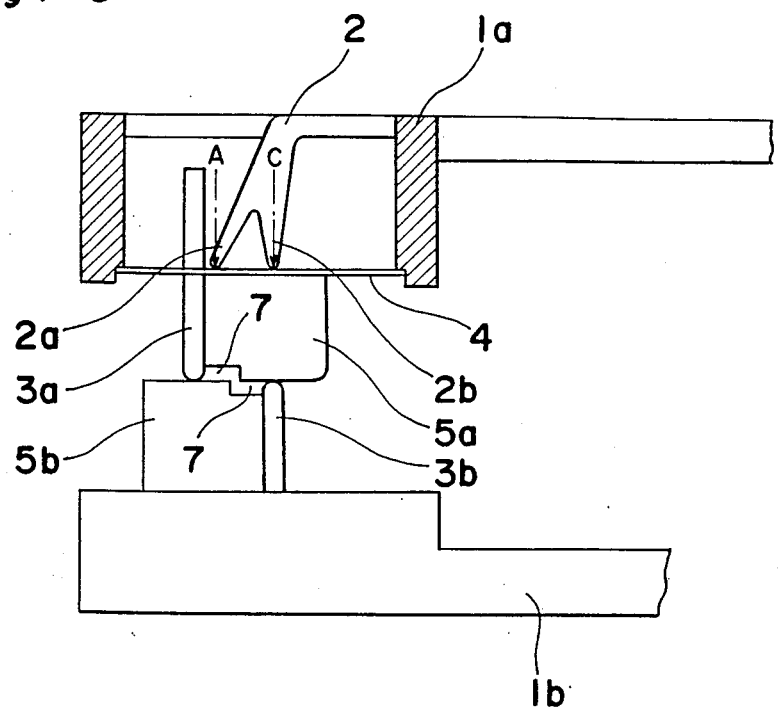
FIG. 8 is an enlarged longitudinal sectional view of an essential part of the magnetic head device shown in FIG. 6.

On the end portion of the top substructure 1a, a pivot 2 for pressing the magnetic head core 3a downward is attached integrally to the substructure 1a and the pressing portion of the pivot 2 forks into two branched arms 2a and 2b so as to press the portions near the pressing points A and C on the upper slider 5a simultaneously according to the above mentioned experiment, thereby the branched arm 2a presses the portion near the above mentioned point A on the upper slider 5a supported by the gimbal spring 4 and simultaneously the branched arm 2b presses the portion near the point C on the upper slider 5a. The points A and C correspond to the points A and C shown in FIGS. 5(a) and 5(b). The distance between the two points A and C is about 1.0 mm. In the arrangement mentioned above the branched arms 2a and 2b are formed integrally as a single body of the pivot 2, but the present invention is not limited to this type and the branched arms 2a and 2b may be formed respectively of separate members so as to press the respective portions of the two points A and C of the disc. A space 7 is provided for the outflow of air, and a coil 6 is wound on each of the cores 3a and 3b.

The present invention has the above mentioned structure and since the upper core and the lower core can be pressed simultaneously, the head displacement can be decreased to a degree of ±0.002° and a high reproduction output of 0.5 V can be obtained.

The invention being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A magnetic head for use in writing and/or reading information on a rotating magnetic disc comprising: a first head core connected to an end surface of a first slider, a second head core connected to an end surface of a second slider each combination of head core and slider having an opposing surface which sandwich a magnetic disc therebetween, a gimbal spring on which one of said head core and slider combination is mounted and a pivotal means for pressing said magnetic disc by selectively applying pressure to said gimbal spring at predetermined points of contact, said pivotal pressing means having two pressing members aligned in a radial direction with respect to said magnetic disc said two pressing members producing two pressure points arranged so that a first pressure point is juxtapositioned to one of said first and second head cores and a second pressure point is positioned opposite the other of said head cores which causes said magnetic head to contact the surface of said magnetic disc in a uniform manner.

2. The magnetic head of claim 1, wherein said gimbal spring is freely movable along a radial direction and circumferential direction of said magnetic disc.

3. The magnetic head of claim 1, wherein said pivotal pressing means comprises a forked pivot having branched pressing members for applying pressure to said gimbal spring opposite said underlying slider.

* * * * *